Oct. 14, 1969

J. C. BALCH 3,472,314

TEMPERATURE CONTROL TUBE

Filed July 26, 1967

INVENTOR
JOSEPH C. BALCH

BY Dunlap and Laney
ATTORNEYS

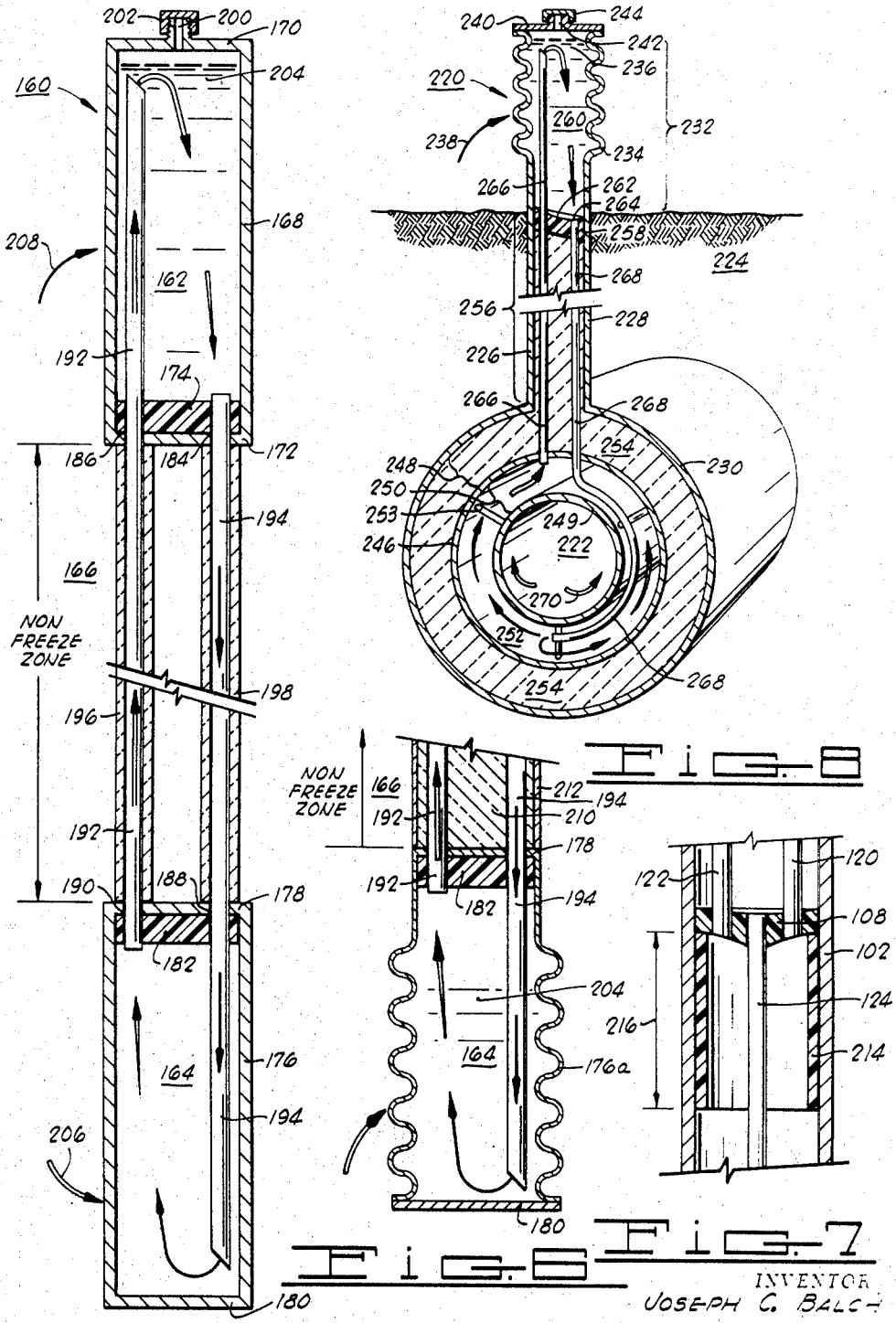

United States Patent Office 3,472,314
Patented Oct. 14, 1969

3,472,314
TEMPERATURE CONTROL TUBE
Joseph C. Balch, Salcha, via Fairbanks, Alaska, assignor to Thermo-Dynamics, Inc., Seattle, Wash., a corporation of Nevada
Filed July 26, 1967, Ser. No. 656,255
Int. Cl. F28d 15/00; F28f 13/00, 9/00
U.S. Cl. 165—106                          5 Claims

ABSTRACT OF THE DISCLOSURE

An apparatus for extraction of heat from selected matter by circulating a coolant in heat exchanging relationship with the matter as well as to a removed region where the coolant material is cooled; it is proposed to employ a generally tubular shaped enclosure which is divided off by insualtive material into heat rise and cold drop sections such that a coolant filling the enclosure will maintain a circulatory, heat-exchanging flow in response to the natural heat differential existing between the matter adjacent opposite ends of the enclosure.

CROSS-REFERENCE TO RELATED APPLICATION

The subject matter of the present application is related to the U.S. Patent No. 3,220,470 issued Nov. 30, 1965 in the name of Joseph C. Balch and which is now the subject of re-issue Patent No. Re. 26,387 granted May 7, 1968.

BACKGROUND OF THE INVENTION

Field of the invention

The invention relates generally to passive-type heat exchange apparatus, and more particularly, but not by way of limitation, it relates to improved freeze tube apparatus for use in maintaining bodies of matter at a desired temperature and/or state of solidification or fluidity.

Description of the prior art

The prior art includes various types of heat exchange apparatus which serves the basic function of moving a heat absorbing coolant material from a first position where heat is removed to a second cooling position where the excess heat is released or somehow eliminated from the closed system. Such systems are a necessary component of the various types of apparatus for air conditioning, refrigeration, and may other household and industrial applications. There are still other prior teachings which are directed to utilizing earth or water bodies, naturally occurring, constant temperature sources, as a heat absorbing or condensing medium in various types of heat exchange apparatus. In the main, these are directed to various types of heat pumps which include rather extensive surface apparatus but which may employ wells or other earthen masses as heat transfer elements in the refrigeration cycle. It has also been proposed to insert a freezing pipe in the ground for the purpose of forming a frost wall as an aid in the excavation of shafts down through the earth. This application also requires extensive surface apparatus for the purpose of heat exchange and the refrigerative cycling of coolant through the subterranean pipe formation.

SUMMARY OF THE INVENTION

The present invention contemplates a passive-type heat exchange apparatus wherein a tube-like enclosure member is compartmented by insulative structure such that a coolant contained within the enclosure will circulate in desired heat exchanging relationship in response to temperature differential between the upper and lower ends of the enclosure. In a more limited aspect, the invention consists of an upper and lower enclosure member rigidly secured together but spaced by an insualtive partition, and further including an insulated heat rise conduit leading through the insulative partition to the upper end of the upper enclosure, and an insulated cold drop conduit leading through the insulative partition to the lower end of the lower enclosure, and a selected coolant substantially fills the upper and lower enclosures and circulates therethrough in migratory flow in response to thermo-syphonic action which occurs in response to temperature changes.

Therefore, it is an object of the present invention to provide a passive, self-regulating heat exchange apparatus.

It is also an object of the invention to provide such a passive heat exchange apparatus which can be permanently positioned to freeze unstable earth formations, such as the permafrost layer in arctic and subarctic regions, to enable the formations to support various types of structures such as building foundations, transmission line towers, bridge pilings etc.

It is a further object of the present invention to provide a self-regulating heat exchange device which can be permanently disposed in piled or bulk-stored agricultural products such as grains, sugar beets, ensilage and other forms of organic matter which may otherwise be damaged by self-generating temperatures.

Finally, it is an object of the present invention to provide such a passive, heat exchanging apparatus which is constructed of sturdy yet inexpensive material to employ selected coolants from a group of commonly available substances, and which can be positioned and left permanently or for long periods of time in an operative, heat-exchanging relationship.

Other objects and advantages of the invention will be evident from the following detailed description when read in conjunction with the accompanying drawings which illustrate the invention.

BRIEF DESCRIPTION OF THE DRAWINGS

FIG. 5 is still another alternative embodiment of the present invention in vertical section;

FIG. 6 illustrates alternative structure which may be utilized in such as the embodiment of FIG. 5;

FIG. 7 shows an adaptive element for inclusion in the various structures of the invention; and FIG. 8 is a vertical section showing another alternative form of the present invention.

DESCRIPTION OF THE BASIC EMBODIMENT

Figures 1, 2, 3A, 3B, 4:
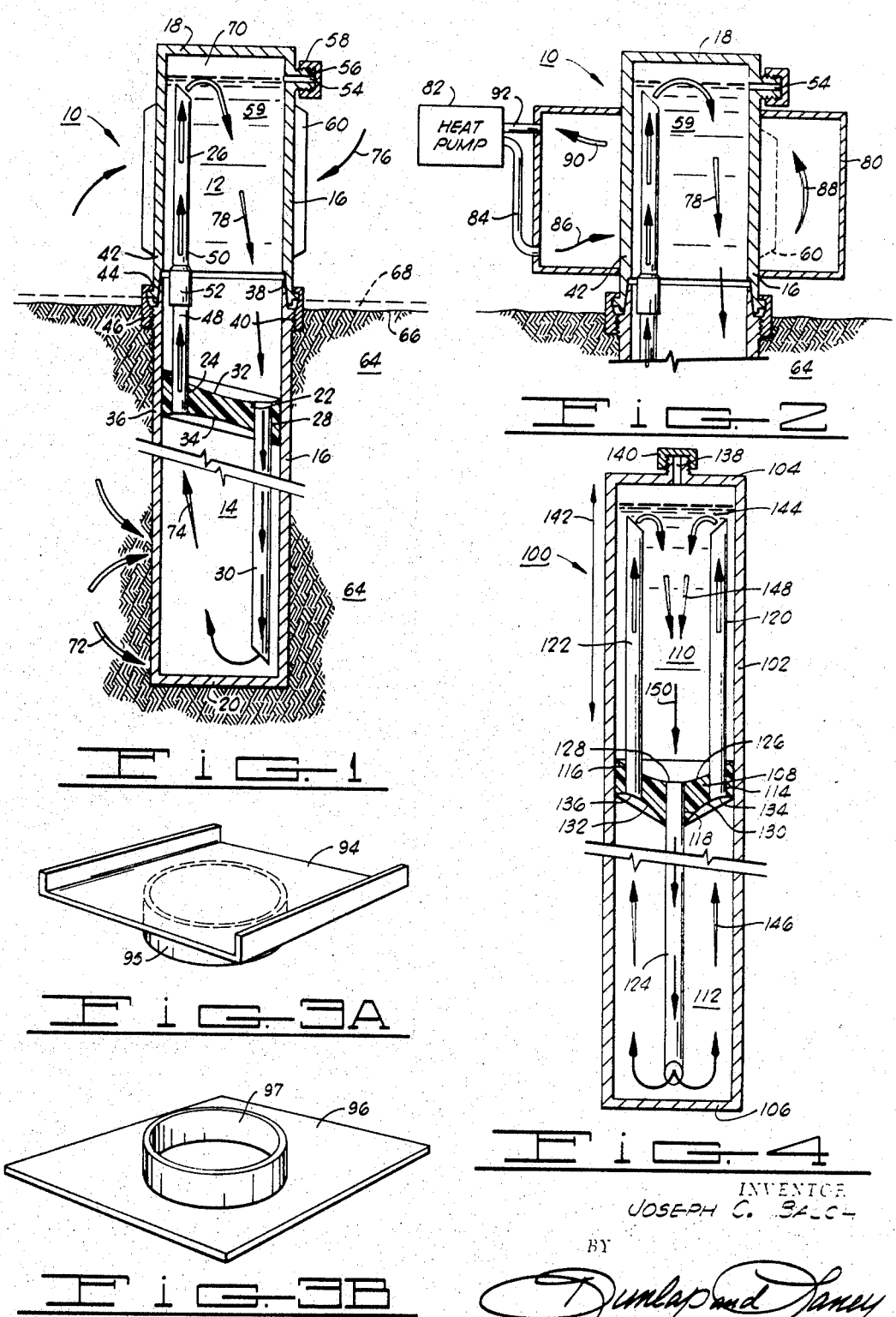
FIG. 1 is a preferred or basic embodiment of the invention shown in vertical section as disposed in an earth medium.
FIG. 2 is a sectional view of alternative structure employed with the device of FIG. 1.
FIGS. 3A and 3B depict attachment structure which is used to convert the device of FIG. 1 for use as a load bearing pile.
FIG. 4 is an alternative embodiment of the invention shown in vertical cross-section.

As shown in FIG. 1, a temperature control tube 10 is divided into a first or upper enclosure 12 and a second or lower encolsure 14. The temperature control tube 10 is formed by an elongated casing 16 and having upper and lower closed ends 18 and 20 and being sealingly partitioned into upper and lower enclosures 12 and 14 by means of an insulative partition or block 22.

The insulative block 22 may be formed from one of various insulative materials and shaped to fit the cross-sectional configuration of casing 16 so that a reasonably fluid-tight block is imposed. Insulative block 22 is formed with a first hole 24 therethrough, and a first conduit or heat rise tube 26 is rigidly secured therein to extend upward to the top of first enclosure 12. Similarly, a second, oppositely disposed hole 28 through insulative block 22 receives a second conduit or cold drop tube 30 in secure engagement and cold drop tube 30 extends downward to the lower reaches of the second enclosure 14. The first and second conduits 26 and 30 are preferably formed of an insulative material, i.e. plastic tubing, selected ceramics, or such, and their respective inside diameters are selected in accordance with the coolant viscosity to provide desired fluid valving action as will be further described below. The vertical holes 24 and 28 are disposed on opposite sides of insulative block 22 to enable most advantageous circulatory flow and the respective upper surface 32 and lower surface 34 of insulative block 22 may be dished toward the respective holes 28 and 24 in the direction of fluid flow.

The casing 16 may be formed of various materials which exhibit good heat conductivity. For example, if the temperature control tube 10 were to be used as a load-bearing pile the casing 16 would necessarily have to be formed of heavy, structurally sturdy material such as heavy gauge steel and, on the other hand, use of the temperature control tube 10 in a non-load bearing capacity would enable the use of very light materials in forming casing 16. Casing 16 may also be formed in interchangeable sections as depicted in FIG. 1. The lower enclosure 14 is formed by a lower tube member 36 having its upper end formed for connection by means of tapered surface 38 and threads 40. The upper enclosure 12 is similarly formed by means of tube member 42 having a mating taper 44 and a threaded connection 46 retained thereon. The insulative conduit 26 may or may not be designed to be slidingly constructed from a lower portion 48 and an upper portion 50 having an enlarged connector portion 52. In any event, the temperature control tube 10 can be formed by connection of upper tube member 42 to lower tube member 36 with sealed connection being made through threaded connector 46 and threads 40, and including sealing compound, cement or whatever.

The temperature control tube 10 may include a fill hole 54 as formed by a threaded nipple 56 and sealing cap 58 for the purpose of filling the upper and lower enclosures 12 and 14 with a selected coolant 59. Also, if it is found to be necessary, fill hole 54 will suffice for periodically checking the coolant level within the unit. Any of various coolants may be used and some which have been found to operate to good advatnage are: ethylene glycol, gasoline, kerosene, diesel fuel and Stoddard solvent. There are no doubt many other suitable coolants which can be employed for specific applications within pre-set temperature ranges. Also, the upper portion of casing 16 may be formed to have cooling fins 60 disposed therearound in varying number, depending upon the design applications.

In operation, the temperature control tube 10 is placed in the earth or other such matter 64 to about the level of the threaded coupling connector 46. In the event that temperature control tube 10 is employed for refrigeration of a permafrost soil layer, i.e. earth 64 being a permafrost strata, an insulative layer 68 may be applied to cover surface 66. In some arctic and subarctic regions the insulatiive layer 68 may be comprised of the tundra or such related matter. The lower end of casing 16 may be of any length which is suitable for its particular application. Thus, when used as a building piling to provide footing in the permafrost layer a shorter temperature control tube 10 of heavier construction will be utilized and, if the temperature control tube 10 were employed to reduce the heat within a pile of sugar beets, it would be formed from a much longer casing 16, especially lower tubing member 36, and there would be little requirement for heavy, load-bearing structure.

Thus, the temperature control tube 10 is placed in operative position and the coolant 59 is introduced through fill hole 54 to substantially fill the casing 16, i.e., the coolant level brought up to the level of fill hole 54 is sufficient to submerge the upper outlet of upper conduit 26 while allowing a small but ample expansion space 70. Heat, as shown by white arrows 72, will be conducted through lower tubing member 36 to be absorbed by the coolant 59 and heat it up, as shown by the black-to-white arrow 74, such that it starts to rise through the heat rise or first conduit 26. At the same time, the coolant 59 contained in upper enclosure 12 undergoes heat change in response to the cold temperature of the outside air, as shown by black arrows 76, as conducted through cooling fins 60 and upper tubing member 42. Cooling of the coolant 59, as depicted by the white-to-black arrow 78, then results in a downward migration of coolant through the cold drop or second conduit 30. The circulatory flow of coolant 59 will then continue at varying rates, depending upon the temperature differential existing between the upper and lower ends of casing 16, and the temperature control tube 10 will continually remove heat from the earth or such matter 64 to maintain it in a frozen or reduced temperature state.

The selection of a coolant is influenced somewhat by considerations for the viscosity of the coolant material throughout a predetermined temperature range which will apply for a given freeze tube application. Further, and also in accordance with the viscosity characteristics, it may be desirable to regulate the inside diameter of the heat rise tube 26 and the cold drop tube 30 or at least to regulate their entry sides at respective dished surfaces 32 and 34 of insulative block 22, such that their respective resistances to coolant flow will yield a desired valving-type action.

FIG. 2 depicts an alternative use of temperature control tube 10 which may be employed for certain applications requiring more extreme heat changes. Thus, a cooling enclosure 80 is installed in relatively sealed relationship around the upper end of casing 16 which may or may not include cooling fin 60. A conventional form of heat pump 82 is then employed to apply cooled fluid flow through input line 84 with heat absorbing circulation through enclosure 80, as depicted by black arrow 86, black-to-white arrow 88 and the white arrow 90 depicting the warmed circulation for return through line 92 to the heat pump 82. Thus, the coolant flow within casing 16 proceeds with a much increased cooling rate as effected by heat exchange between the coolant 59 and the inner confines of cooling enclosure 80.

The attachments of FIGS. 3A and 3B may be employed on such as temperature control tube 10 for certain applications, particularly for load-bearing pile applications. Thus, an upper plate 94 of predetermined gripping configuration is formed with a collar 96 secured thereon for the purpose of being received down over the top of the similarly shaped casing 16. FIG. 3B shows a bottom or footing plate 96 having a similar collar 97 secured thereon and disposed to be received over the lower end of a temperature control tube 10. The footing plate 96 may be shaped in various configurations to suit particular applications and the securing collars 95 and 97 may be supplied with suitable fastening devices to assure their secure affixure to the temperature control tube 10.

Referring now to FIG. 4, a different form of heat control tube 100 is constructed from a unitary casing 102 having a closed upper end 104 and a closed lower end 106. The casing 102 may be formed of any heat-conducting material, the structural rigidity fitting the application, and it may be designed to be a particular length as dictated by usage. In insulative block 108 is formed of insulative material, e.g. plastic, rubber or such, and inserted in compartmenting, secure affixture across the casing 102. Insulative block 108 is shaped to have a pair of outwardly disposed holes 114 and 116 and a centrally disposed hole 118 through which coolant flow takes place. Thus, a pair of heat rise conduits 120 and 122 are formed of insulative material and rigidly inserted through respective outer holes 114 and 116. A cold drop tube 124 is similarly rigidly connected through the central hole 118 to extend downward to the lower end of lower enclosure 112. The insulative block 108 has its upper surface dished centrally toward the entrance orifice 128 of the cold drop tube 124. The underside of insulative block 108 is then formed as two generally semi-circular dished areas 130 and 132 which taper toward respective entry orifices 134 and 136 of heat rise tubes 120 and 122.

A fill hole 138 closed by a sealable screw cover 140 provides an opening whereby coolant can be introduced and measured within the temperature control tube 100. Such additional structure as cooling fins, heat pump cooling apparatus, etc. may also be utilized with the temperature control tube 100.

The operation of temperature control tube 100 is similar to that for temperature control tube 10 (FIG. 1). The casing 102 may be inserted in the medium to be cooled up to a predetermined length while leaving a portion exposed in the cooler surrounds, e.g. the upper portion denoted approximately by arrow 142. A selected coolant 144 may then be introduced through fill hole 138, assuring that the coolant level exceeds the upper openings of heat rise tubes 120 and 122. Thereafter, heat absorbed through casing 102 by coolant 144 in the lower enclosure 112 will start an upward migration of coolant, as shown by black-to-white arrows 146 which are undergoing a warming situation, and the warmed coolant 144 gives off heat to the cooler surrounds through the casing 102 (adjacent arrow 142) and the coolant migrates downward as depicted by the white-to-black arrows 148. The circulation of coolant fluid then continues at a rate controlled by temperature differential between the upper and lower ends of heat control tube 100. That is, the cooled coolant or black arrow 150 flow proceeds downward through orifice 128 and the cold drop tube 124 whereupon it absorbs heat until the coolant 144 rises upward through the entrance orifices 134 and 136 through the heat rise tubes 120 and 122. The heat control tube 100 is sufficiently sealed that no loss of coolant will occur over a very long period of time and the tempertaure control tube 100 can be left to carry out its self-regulated cooling function permanently in whatever its application.

FIG. 5 illustrates still another form of the invention which allows for a non-freeze zone along its length. The embodiment of FIG. 5 finds particular application as footing for utility poles, transmission line towers, etc. which must be strung across tide water bays or inlets. The non-freeze zone thus provides a length about which water, including its tide change range, can circulate without upsetting the temperature differential utilized by the freeze tube components. Thus, a temperature control tube 160 comprises an upper enclosure 162 and a lower enclosure 164 which are insulatively separated to form a freeze zone 166 of some selected length.

The upper enclosure 162 may be formed by an upper casing 168 having upper closed end 170 and lower closed end 172 and an insulative member or block 174 is shaped to be seated about the bottom closed end 172 to insulate the upper enclosure 162 from the non-freeze zone 166. The lower enclosure 164 is formed from a casing 176 having upper closed end 178 and lower closed end 180. An insulative member or block 182 is secured within the upper end of lower enclosure 164.

A pair of oppositely disposed holes 184 and 186 are provided in parallel alignment through the lower closed end 172 and upper insulative member 174 while a similar pair of oppositely disposed holes 188 and 190 are placed through upper closed end 178 and lower insulative member 182. The holes 184–190 provide coolant flow connection between the upper enclosure 162 and the lower enclosure 164.

Thus, a first conduit or heat rise tube 192 is disposed to pass from the upper end of lower enclosure 164 through holes 190, non-freeze zone 166 and holes 186 to terminate at the upper end of upper enclosure 162. A second conduit or cold drop tube 194 is disposed to pass from the lower end of upper enclosure 162 through holes 184, non-freeze zone 166 and holes 188 to terminate near the lower end of lower enclosure 164. The respective first and second conduits 192 and 194 are each sealingly retained in their respective ones of feed-through holes 184–190. The first and second conduits 192 and 194 may be formed of suitable insulative material such as plastic, rubber or ceramic materials, and structural rigidity of required amount may be provided by metal tubes 196 and 198 which are rigidly secured between the upper casing 168 and lower casing 176. A fill hole 200 sealable by a screw cap 202 may be provided to introduce and maintain a required amount of a selected coolant fluid 204.

Operation of the temperature control tube 160 is the same as for the previous embodiments. The particular construction of temperature control tube 160 allows its use for supporting structures over water covered areas, the lower casing 176 can be imbedded in an earth formation below the water bottom and its cooling action will serve to freeze or solidify the surrounding earth medium to provide continual support for the loading structure. The design of the temperature control tube 160 will then allow that the non-freeze zone 166 extend through the water layer to support the upper casing 168 in the air or equivalent cooling surrounds.

When the coolant 204 is maintained at a sufficiently high level above the upper opening of heat rise tube 192, the naturally existing temperature differential along the temperature control tube 160 will set up the circulatory coolant migration. The coolant flow will circulate at a rate which is determined by the amount of temperature differential. Thus, heat (white arrow 206) will be absorbed from the matter surrounding lower casing 176 to heat up the coolant in enclosure 164 to cause a flow upward through heat rise conduit 192 while cooling air or such (black arrow 208) effects cooling of the coolant 204 contained within upper enclosure 168 such that it flows downward through the cold drop tube 194.

FIG. 6 illustrates some alternative structure which may be combined with the embodiment of FIG. 5. First, the lower enclosure 164 may be formed from a corrugated casing 176a having the similar upper and lower closed-ends 178 and 180. The corrugated casing 176a may be formed to have a plurality of horizontally folded corrugations for the purpose of multiplying or enlarging the amount of heat absorbing surface. Second, the non-freeze zone 166 can be provided with still further insulating properties by enclosing the first and second conduits 192 and 194 within an insulated packing 210 such as foam plastic, cellular rubber or such, and a central casing member 212 can then be provided to encase and protect the insulating member 210 while providing requisite structural rigidity. Central casing portion 212 may be rigidly secured as by welding to upper closed end 178 of casing member 176a as well as to a counterpart upper casing (not shown).

FIG. 7 shows the manner in which an adaptive element can be included within the various forms of heat control tube to vary the heat exchange pattern. Thus, as shown with heat control tube 100 (FIG. 4) for example, a sleeve 214 formed from selected insulated material is positioned just below the insulative or neutral zone. This can serve to provide a central non-freeze zone 216 similar to that provided for in FIGS. 5 and 6 and the space above and below the insulated zone 216 will still remain active and functioning in the thermosyphonic cycle.

FIG. 8 embodiment

FIG. 8 illustrates an alternative form of temperature control tube 220 which is utilized in combination with a freeze chamber 222. The temperature control unit 220 can be positioned with its lower portion disposed at same predetermined distance within an earth medium 224 such that the freeze chamber 222 and any contents therein can be maintained in a frozen state continually and for an extended period of time. Thus, the freeze chamber 222 may contain various forms of matter for cold storage, e.g. vegetable matter, human tissue, bodies in suspended animation, etc., and the passive nature of the temperature control unit 220 allows the contents of freeze chamber 222 to be maintained frozen for indefinitely long periods of time without need for oversight or periodic maintenance.

The temperature control unit 220 consists of an outer casing 226 which consists of a tubular, vertical neck portion 228 which extends downward and flares into an enlarged storage portion 230. The upper end 232 of tubular portion 228 may be formed to have a plurality of horizontally folded corrugations 234 to increase the area through which a coolant 236 is exposed to the cooling effects of the surrounds (black arrow 238). The top of tube portion 228 is then closed off by a suitable plate 240 secured thereover, plate 240 being fitted with a fill hole 242 and a sealing cap 244. An intermediate casing 246 which is similar in shape but of less volume than storage portion 230 of casing 226 is disposed within storage portion 230 such that it provides a clearance space 248 therebetween. The freeze chamber 222 is formed from an inner casing 249 which is shaped similar to but smaller than the intermediate chamber 246 such that it can be disposed therein while providing a circulation or clearance space 250 therebetween. A plurality of rod supports 253 may be employed to suspend freeze chamber 222 coaxially within the intermediate chamber 246.

The outer clearance space 248 is filled with a suitable insulated material 254, e.g. expanded polystyrene, or various others of the plastics and cellular rubber compounds, and the body of insulative material 254 is extended upward within a portion 256 of the tubular casing 228 which remains below the surface of the earth medium 224. An insulative block 258 is then secured across the tubular casing 228 to define the upper enclosure 260 thereabove. The insulative block 258 may be inserted in tight abutment down against the foam plastic or such filler 254 and its upper surface 262 may be dished out and downwardly tapered toward the downward flowing entry orifice 264 in the manner of previous embodiments.

A first conduit or heat rise tube 266 is inserted to extend from the upper reaches of circulation space 252 upward through the insulation filler 254 and insulative block 258 to terminate at the upper end of upper enclosure 260. A second conduit or cold drop tube 268 is led downward through insulative block 258 and insulative filler 254 into the circulation space 252 whereupon it is bent around the freeze chamber or inner casing 249 and terminated at the lowest point within circulation space 252. Once again, the first and second conduits 266 and 268 may be formed from suitable heat insulative material as is well known in the related plastics forming art.

In operation, the temperature control unit 220 can be positioned in an earth medium; the depth of positioning of casing portion 230 depending upon the annual ambient soil and air temperatures which exist in the particular regions. The body or matter to be maintained frozen is placed in freeze chamber 222 and coolant 236 is introduced until the temperature control unit 220 is very nearly full as shown in FIG. 7. Thereafter, heat is continually absorbed from the matter within freeze chamber 222 as shown by white arrows 270 and this absorption causes heat-up of coolant 236 and upward flow through heat rise tube 266. Circulation is further aided by cooling of coolant within upper enclosure 260 by means of surrounding cool air or such (black arrow 238) and this, in turn, results in downward migration of the coolant through the second conduit or cold drop tube 268. Once the circulation of coolant is enabled, the system will operate continually at varying rates depending upon the temperature differential which exists between the immediate surround of the upper enclosure 260 and the lower enclosure or circulating space 252.

The foregoing discloses a novel passive-type temperature control unit which is capable of freezing and/or maintaining frozen unsable ground such that it renders it capable of supporting various structures. The device also has the ability to stop water seepage through its localized placement in earth-filled reservoir dams, coffer dams, etc. It is contemplated too that the present invention will be used to freeze ice bridges across muskeg for road beds and rail beds and also to freeze pads or platform-type formations for well-drilling rigs. In addition to these many freezing applications the device is capable of advantageous use at other different temperature ranges such as when used to cool the internal, highly pressed bulk of piled agricultural products which might otherwise be damaged by self-generated temperatures.

Changes may be made in the combination and arrangement of elements as heretofore set forth in the specification and shown in the drawings: it being understood that changes may be made in the embodiments disclosed without departing from the spirit and scope of the invention as defined in the following claims:

What is claimed is:

1. Apparatus for freezing or maintaining a body of matter in a frozen state, comprising:
    a hollow elongated member having upper and lower closed ends, said member being formed from heat conductive material and adapted for being positioned in said body of matter such that the upper end projects therefrom;
    a block of insulative material disposed across said hollow elongated member and dividing it into upper and lower spaces each having a volume larger than that of the insulative means, said block of insulative material being formed to have first and second openings and to fit in sealing engagement across said hollow elongated member, the upper surface of said block being formed with a dished shape such that its contour descends into communication with said first opening, and said underside being dished such that its contour ascends into communication with said second opening;
    first conduit means formed from insulative material and extending through said insulative means second opening and upward to terminate near the upper closed end in said upper space;
    second conduit means formed from insulative material and extending through said insulative means first opening and downward to terminate in the lower closed end in said lower space; and
    fluid coolant material substantially filling said elongated member and being capable of circulating through said first and second conduits in response to temperature differential existing in the hollow elongated member adjacent said upper and lower spaces.

2. Apparatus as set forth in claim 1 which is further characterized to include:
    a plurality of cooling fins formed integrally about the upper end of said hollow elongated member.

3. Apparatus as set forth in claim 1 which is further characterized to include:
    chamber means formed in sealed relationship about the upper end of said hollow elongated member; and
    heat pump means for continually supplying cooling fluent material into said chamber means while removing heated material therefrom.

4. Apparatus as set forth in claim 2 wherein said hollow elongated member further comprises:
    a first elongated member having the upper end closed and having the lower end tapered to receive a similarly shaped end portion;

threaded connector means movably retained about said lower end;

a lower elongated member having a lower closed end and having its upper end shaped to be partly received within the lower end of said upper elongated member; and a threaded portion formed about the upper end of said lower elongated member such that said threaded connector means can be secured thereon in sealing engagement.

5. Apparatus for freezing or maintaining a body of matter in a frozen state, comprising:

a hollow elongated member having upper and lower closed ends, said member being formed from heat conductive material and adapted for being positioned in said body of matter such that the upper end projects therefrom;

a block of insulative material disposed in sealing connection across said hollow elongated member and dividing it into upper and lower spaces each having a volume larger than that of the insulative means, the lower surface of said block being dish-shaped to ascend to each of a pair of first openings with the upper surface dished toward a second opening;

a first pair of conduit means formed from insulative material extending through first openings on opposite side of said insulative block and upward to terminate near the upper closed end in said upper space;

second conduit means formed from insulative material and extending through a second opening of said insulative means and downward to terminate in the lower closed end in said lower space; and fluid coolant material substantially filling said elongated member and being capable of circulating through said first and second conduits in response to temperature differential existing in the hollow elongated member adjacent said upper and lower spaces.

References Cited

UNITED STATES PATENTS

| | | | |
|---|---|---|---|
| 1,913,573 | 6/1933 | Turner | 165—177 X |
| 308,197 | 11/1884 | Rober | 165—106 X |
| 2,461,449 | 2/1949 | Smith et al. | 165—45 X |
| 2,937,009 | 5/1960 | Anderson | 165—45 X |
| 3,217,791 | 11/1965 | Long | 165—105 X |
| 3,220,470 | 11/1965 | Balch | 165—45 X |

FOREIGN PATENTS

| | | |
|---|---|---|
| 948,380 | 1/1949 | France. |
| 1,028,617 | 2/1953 | France. |
| 500,133 | 2/1939 | Great Britain. |
| 393,386 | 10/1965 | Switzerland. |

ROBERT A. O'LEARY, Primary Examiner
ALBERT W. DAVIS, Assistant Examiner

U.S. Cl. X.R.

165—45, 67, 105, 136